United States Patent [19]

Ege

[11] Patent Number: 5,242,104
[45] Date of Patent: Sep. 7, 1993

[54] AUTOMATIC FUSION APPARATUS AND METHOD

[75] Inventor: Sigmund Ege, Oslo, Norway

[73] Assignee: Kloften and Kloften (U.S.A.) Inc., Boynton Beach, Fla.

[21] Appl. No.: 989,182

[22] Filed: Dec. 14, 1992

[51] Int. Cl.⁵ .................................................. B23K 3/06
[52] U.S. Cl. ........................................ 228/244; 228/5.7; 228/41; 219/85.14
[58] Field of Search ................. 228/244, 247, 5.7, 11, 228/33, 41, 52; 219/61.4, 124.01, 75, 76.15, 84.15, 84.14

[56] References Cited

U.S. PATENT DOCUMENTS

| | | | |
|---|---|---|---|
| 4,110,592 | 8/1978 | Ege | 228/249 |
| 4,563,563 | 1/1986 | Ege | 228/5.7 |
| 4,729,553 | 3/1988 | Ege | 269/225 |
| 4,932,581 | 6/1990 | Ohle et al. | 228/41 |
| 5,062,566 | 11/1991 | Ege | 228/5.7 |

FOREIGN PATENT DOCUMENTS 520044  2/1931  Fed. Rep. of Germany ........ 228/41

Primary Examiner—Samuel M. Heinrich
Attorney, Agent, or Firm—Victor F. Volk

[57] ABSTRACT

Apparatus and method are described for the automatic feeding of solder or other bonding agent with tension applied to the solder supply so that it retracts from the point of fusion an instant before it is entirely liquified.

12 Claims, 3 Drawing Sheets

AUTOMATIC FUSION APPARATUS AND METHOD

BACKGROUND OF THE INVENTION

In my U.S. Pat. Nos. 4,110,592, 4,563,563, 4,729,553, and 5,062,566, the disclosures of which are incorporated herein by reference, I have described methods and apparatus for the solder joining of copper and copper alloy tapes and carrier strips wherein the fusion of the solder occurs between carbon electrodes. In the application of my inventions to carrier strips for fine electrical connectors it has become increasingly important to make sure that none of the solder, which is supplied in the form of a fine tape or wire, should foul passage of the strips through subsequent operations. To this end I had been retracting the supply of solder as soon as possible after fusion. Now, however, I have discovered that my methods can be improved by automatically applying tension to the solder as it is supplied, so that excess solder is withdrawn as soon as it is sufficiently weakened by heating, although it is not actually fluidized, and I have devised novel means for practicing this method.

SUMMARY OF THE INVENTION

My invention comprises spring means for applying tension to a heat-fusible material, such as silver-solder, that is being firmly held to an article being fused, so that the unused solder supply, which may preferably have the form of a tape or wire, will retract upon substantial heating an instant before the actual fusion is completed.

My invention may advantageously comprise a reversible shaft and motor means for driving it, a sleeve that is slidable on the motor shaft and that supports means for advancing and retracting the solder tape, and a coupling. The coupling comprises two elements, the first of which has a radial relief and is fixed to rotate with the shaft, and the second of which is fixed to the sleeve and has a projection that is inserted into the relief of the first element. A helical-torsion-spring with radially extending ends, is mounted on the motor shaft with one of these ends being urged against the relief in one coupling element and the other being urged against the projection in the other coupling element. Automatic means are provided for momentarily reversing the shaft while the forward end of the solder supply is still firmly held but before it is fused.

I have invented a method of soldering that comprises the steps of advancing an end of an elongated supply of solder or other heat-fusible binding material into proximity with an article, such as a copper tape, to be soldered and clamping this end. Then I apply tension that urges the supply to retract, which it cannot do because the end is clamped. Finally I heat the gripped end as by passing electric current through carbon electrodes. This first heats the solder so that it weakens enough for the tension to retract it, and then causes the gripped end to liquify.

DETAILED DESCRIPTION OF A PREFERRED EMBODIMENT

Figure 1:
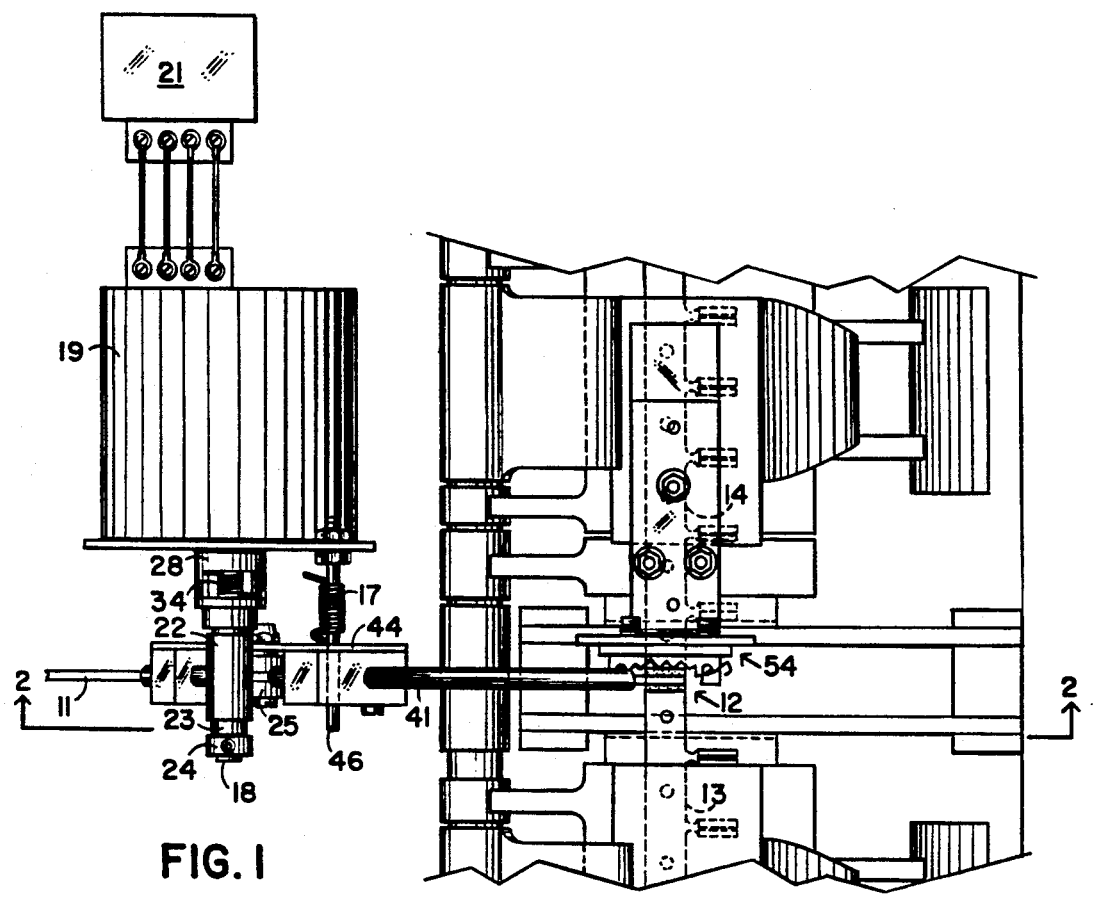
FIG. 1 shows an plan of my apparatus with the upper electrode lowered.
Figure 4:
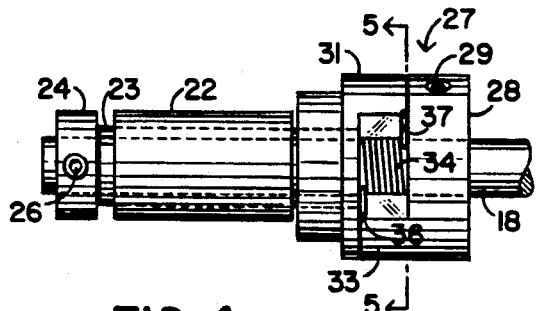
FIG. 4 shows an elevation of a portion of the shaft of FIG. 1 and a clutch mounted thereon.

Referring first to FIG. 1, my apparatus 10 serves to feed an elongated supply 11 of silver-solder to a station 12 where it can be fused to bond strips 13 and 14 of connector strip into one continuous length between two carbon electrodes 16, 17 (FIG. 4). Although I have preferred to use carbon electrodes, electrodes of metals that are inert at high temperature, such as tungsten, may be used within the scope of my invention. The supply 11 is urged to advance or retract by the rotation of a shaft 18 of a stepping motor 19 of known construction, such as a solenoid-stepping motor available from Ledex, Inc. of Vandalia, Ohio. The motor 19 is actuated by a commercially available timer 21 and drives the shaft 18 counterclockwise as programmed by the timer 21, but, at the end of each forward movement, turns it clockwise through a predetermined angle.

Figure 7:
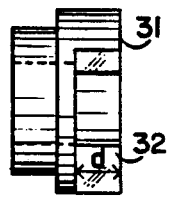
FIG. 7 shows a side view of the element of FIG. 6.
Figure 6:
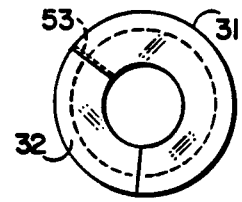
FIG. 6 shows an end view of one of the two elements of a clutch of FIG. 4.
Figure 10:
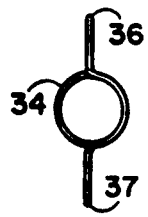
FIG. 10 shows an end view of the tension spring of FIG. 4.
Figure 9:
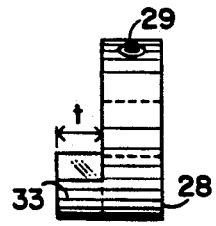
FIG. 9 shows a side view of the element of FIG. 8.
Figure 8:
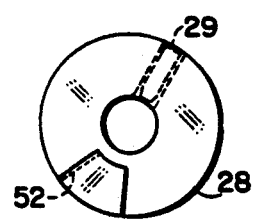
FIG. 8 shows an end view of the other element of the clutch of FIG. 4.
Figure 11:
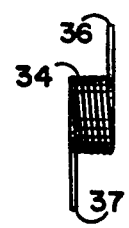
FIG. 11 shows a side view of the tension spring of FIG. 10.

The supply 11 of solder, which is stored on a spool or reel (not shown) passes between a plastic sleeve 22 surrounding a length of the shaft 18 and a cooperating idler roll 25 which grip the solder supply firmly enough between them to advance or retract it the precise amounts directed by the timer 21. The sleeve 22 is not bonded directly to the shaft 18 but is bonded onto a metal cylinder 23 (FIG. 4) that is concentric to the shaft and can turn freely on it but is restrained from lateral movement by a collet 24 and set screw 26, or other means, to be described. The shaft 18 also mounts a two-element clutch 27 of which an element 28 (see FIGS. 8 and 9) is fixed to the shaft by a set screw 29, and a cooperating element 31 (see FIGS. 6 and 7) is fixed around the cylinder 23. The element 31 has a radial wedge-shaped relief 32 having a depth "d" that matches the thickness "t" of a projection 33 of the element 28. A helical torsion-spring 34 with an inside diameter tightenably fittable over the shaft 18 has extending ends 36, 37 and fits over the shaft 18 within the volume of the relief 32 and when the projection 33 is introduced into the relief 32 the spring 34 is tightened so that the extending end 37 is urged against a wall 38 of the relief 32 and the other extending end 36 is urged against a wall 39 of the projection 33.

Referring to FIGS. 6, 7, 8, and 9 means are shown by which the elements 28, 31 are prevented from separating axially without need for the collet 24, so that heavier or lighter springs 34 can be substituted quickly. To this end a narrow radial groove 52 has been formed in the wall 39 of the projection 33 to accept the end 36 and a narrow radial groove 53 has been formed in the wall 38 to accept the end 37.

Upon leaving the sleeve 22 and roll 25 combination the solder supply 11 passes through a guide tube 41 (FIG. 2) that directs it onto the flat surface of the carbon electrode 17 (FIG. 2) between the ends of the strips 13, 14. The other carbon electrode 16 is lowered over the electrode 17, clamping the end portion of the solder supply 11 and the two strips to be joined. At this time the rotation of the shaft 18 is reversed and current is switched on to flow between the two electrodes 16, 17 through conventional wiring, not shown.

The idler roll 25 is mounted on a plate 44 which also mounts the guide tube 41. The plate 44 swivels around a sturdy rod 46 that is fixedly mounted to extend from the housing of the motor 19 parallel to the shaft 18. A spring 47 urges the plate 44 to force the idler 25 and solder supply 11 against the sleeve 22. Tension in the spring 47 is selected in a known manner so that friction against the sleeve is great enough to resist the pressure from the spring 34 that urges the sleeve to turn. Thus, when the shaft 18 turns counterclockwise a wall 45 of the projection 33 is urged against a wall 35 of the relief 32, turning the clutch element 31, cylinder 23, and sleeve 22 the predetermined distance needed to cover the desired extent of the edges of the two strips 13, 14 and then reverses the rotation of the shaft 18 for a fraction of a revolution. When the shaft reverses, however, the supply 18 cannot retract since it is clamped between the electrodes 16, 17, or other clamping means, to be described. Instead, the element 31 remains stationary while the projection 33 turns in the relief 32, pushing the end 36 of the spring 34 ahead of it to tighten the spring and thus apply tension to the solder supply 11 between the rolls 22, 25 and the electrodes 16, 17. The element 28, however continues to turn until the projection 33 advances to a position such as that shown in FIG. 5B, tightening the spring 34.

Figure 5A:
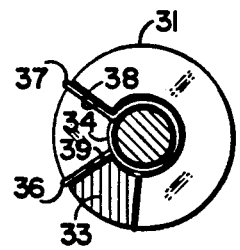
FIGS. 5A and 5B show sections through the line 5—5 of FIG. 4 when solder is advancing and retracting, respectively.
Figure 5B:
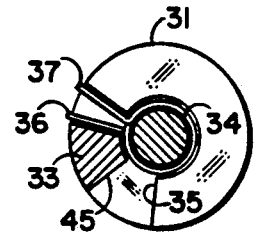

When the solder is weakened enough at the electrodes it parts and permits the unheated length to retract and the clutch elements to return to the relative position of FIG. 5A.

Figure 2:
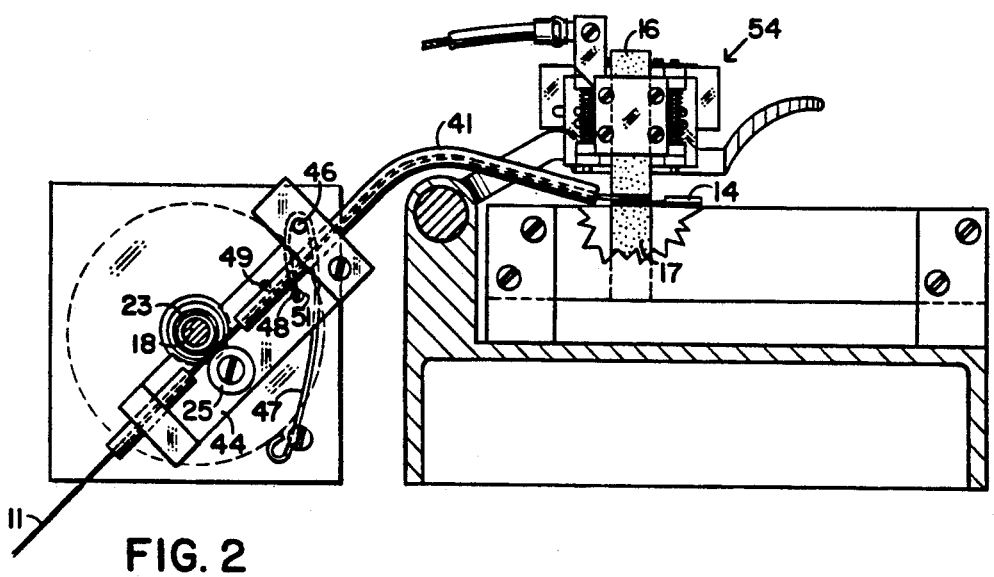
FIG. 2 shows a partially sectionalized elevation of the apparatus of FIG. 1.
Figure 3:
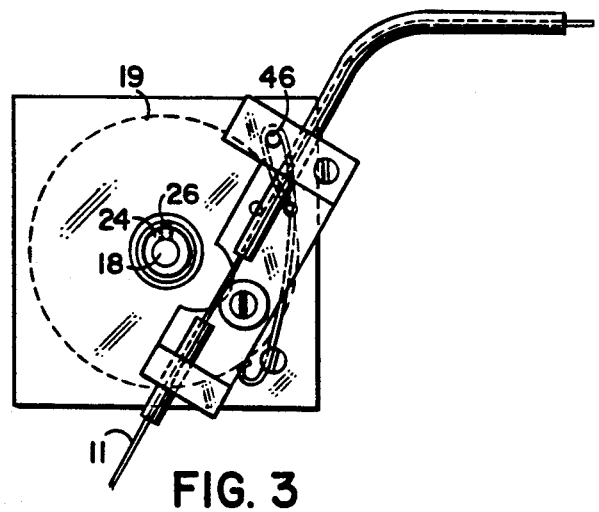
FIG. 3 shows the elevation of the feed apparatus of FIG. 2 with the solder supply disengaged from the drive sleeve.

Referring to FIG. 2, tension of the spring 47 is adjustable by simply transferring a bent end 48 of the spring from a hole 49 in the plate 44 to a hole 51.

Figure 12:
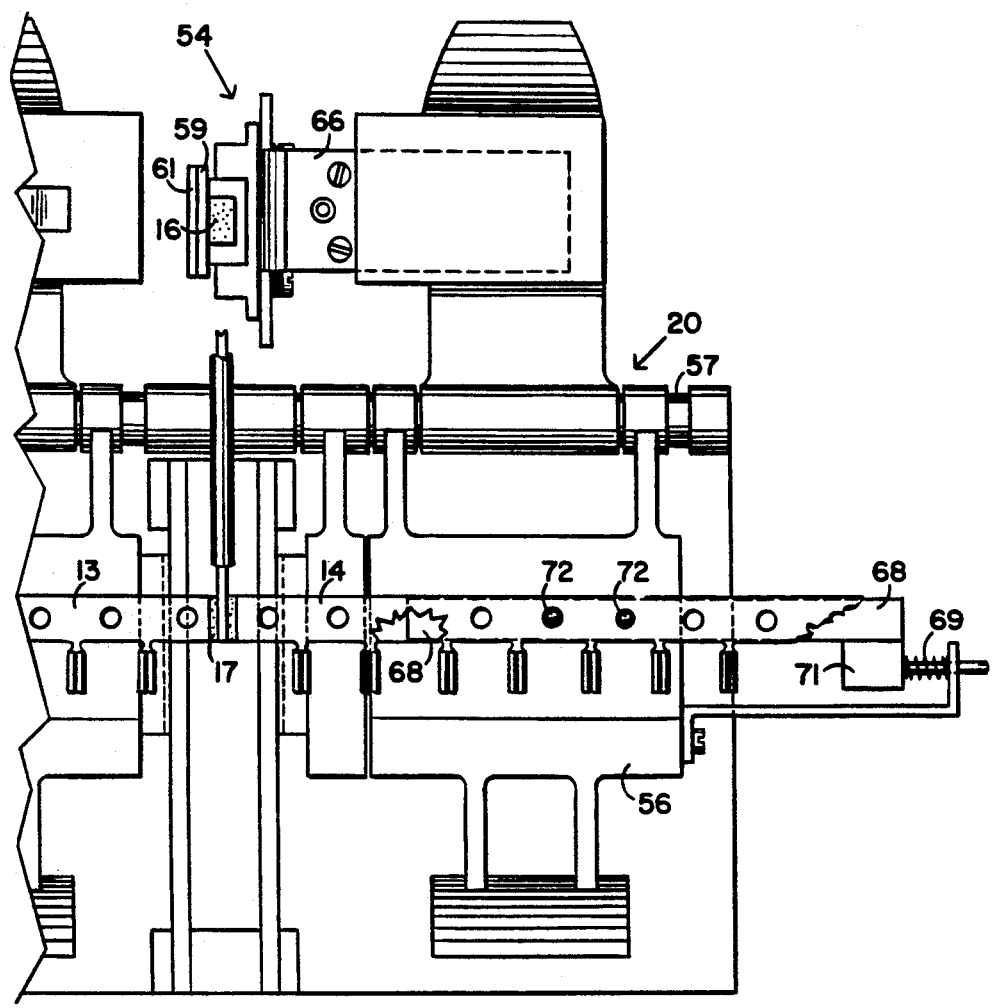
FIG. 12 shows the plan view of FIG. 1 with the solder feed omitted and the upper electrode raised.
Figure 15:
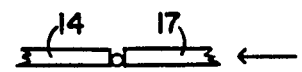
FIG. 15 shows solder wire being clamped by the pressure of strip ends.
Figure 13:
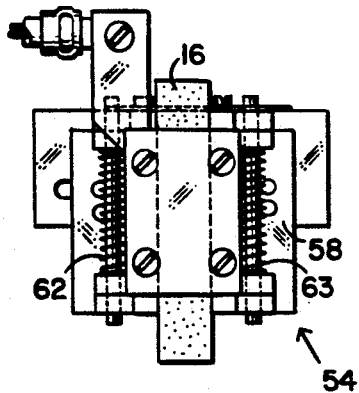
FIG. 13 shows an end elevation of an upper electrode assembly.
Figure 14:
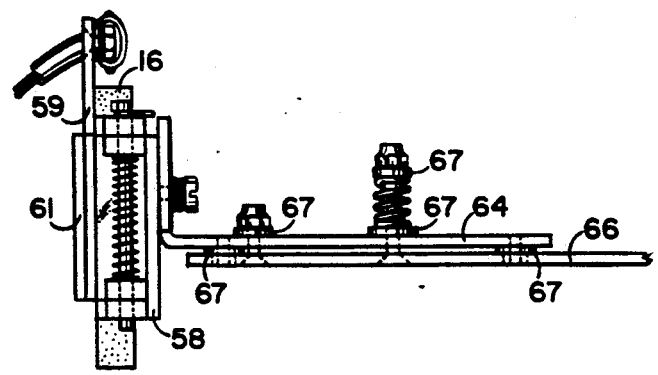
FIG. 14 shows a side elevation of the assembly of FIG. 13.

To further explain the means and method of clamping the end of the solder supply against withdrawal, referenced is made to FIGS. 12-15. In FIG. 12, a soldering machine 20 comprises an upper jaw 54 and lower jaw 56 hinged around a rod 57 to be brought together manually by lowering the upper jaw 54 as shown in FIG. 1, where the jaws 54, 56 clamp closed in a known manner. The electrode 16 is held in an assembly 58 which permits the vertical movement of a copper plate 59 and pressure plate 61, which are bolted to grip the electrode 16, against compression springs 62, 63. The assembly 54 comprises an angle 64 which is bolted to a plate 66 but is electrically insulated therefrom by plastic washers 67—67. The electrode 16 is locked in the assembly 54 in such a position that when the jaws 54, 56 are closed together the electrode 16 will press into the solder end and rise against the spring pressure sufficiently to put the desired clamping action on the solder 11. This vertical clamping of the solder supply is satisfactory when tape solder is used to overlap the ends of the strips 13, 14 or when the solder is thicker than the strip so that it contacts both the upper and lower electrodes. But when solder is used to make a butt splice, particularly round solder wire that is smaller in diameter than the strip thickness (FIG. 15) the solder cannot be clamped by the pressure of the electrodes. A structure to clamp small diameter solder is shown in FIG. 1 where a slide bar 68, in a groove in the lower jaw 56, is urged to the left by a compression spring 69 that acts against a block 71 secured to the bar 68. The stop 14 is carried on the slide 68 and moved with it by means of pins 72—72 projecting through periodic holes in the strip.

The foregoing description of my apparatus and method has been exemplary rather than definitive of my invention, for which Letters Patent are sought in accordance with the following claims.

I claim:

1. In a fusion apparatus comprising means for advancing an elongated supply of heat-fusible material to an article to which it is to be fused, means for firmly holding a portion of said supply near said article, and means for heating said heat-fusible material to the temperature of fusion; the improvement comprising:
    means for applying tension to said heat-fusible material prior to fusion whereby an unfused portion of said supply will retract from said article upon substantial heating but before liquefaction is complete.

2. The apparatus of claim 1 wherein said heat-fusible material comprises silver solder.

3. The apparatus of claim 2 wherein said supply comprises a flat tape.

4. The apparatus of claim 2 wherein said supply comprises a round wire.

5. The apparatus of claim 1 wherein said means for applying tension comprises a spring.

6. The apparatus of claim 1 comprising:
    a shaft,
    means for driving said shaft to rotate both clockwise and counterclockwise,
    a sleeve, rotatable on said shaft, bearing means for advancing and retracting said elongated supply of heat-fusible material,
    a coupling comprising first and second elements thereof mounted on said shaft, said first element comprising a radial relief thereof, and said second element comprising a projection inserted into said relief of said first element, one of said elements being fixed to rotate with said shaft and the other of said elements being fixed to said sleeve,
    a helical-torsion-spring rotatably mounted around said shaft, one end of said spring being urged to turn a wall of said relief and the other end of said spring being urged to turn said projection, and
    automatic means for momentarily reversing said shaft rotation while said supply of heat fusible material is held by said holding means but before the complete liquefaction of said heat-fusible material.

7. The apparatus of claim 6 wherein a wall of said relief of said first element and a wall of said projection of said second element comprise radial grooves closely fitting said ends of said spring thereby preventing the axial separation of said first and second elements.

8. The method of fusing fusible material to an article comprising the steps of:
   (A) advancing an end of an elongated supply of fusible material into proximity with said article,
   (B) clamping said end to said article,
   (C) applying tension urging said supply to retract, and thereafter
   (D) heating said end, thereby allowing the retraction of said supply and fusing said end being clamped.

9. The method of claim 7 wherein said article comprises copper.

10. The method of claim 7 wherein said fusible material is silver solder.

11. The method of claim 7 wherein said end is clamped by carbon electrodes and said heating is effected by passing current through said electrodes.

12. The method of claim 8 wherein said end is clamped by the pressure between two articles being joined.

* * * * *